United States Patent Office 3,174,718
Patented Mar. 23, 1965

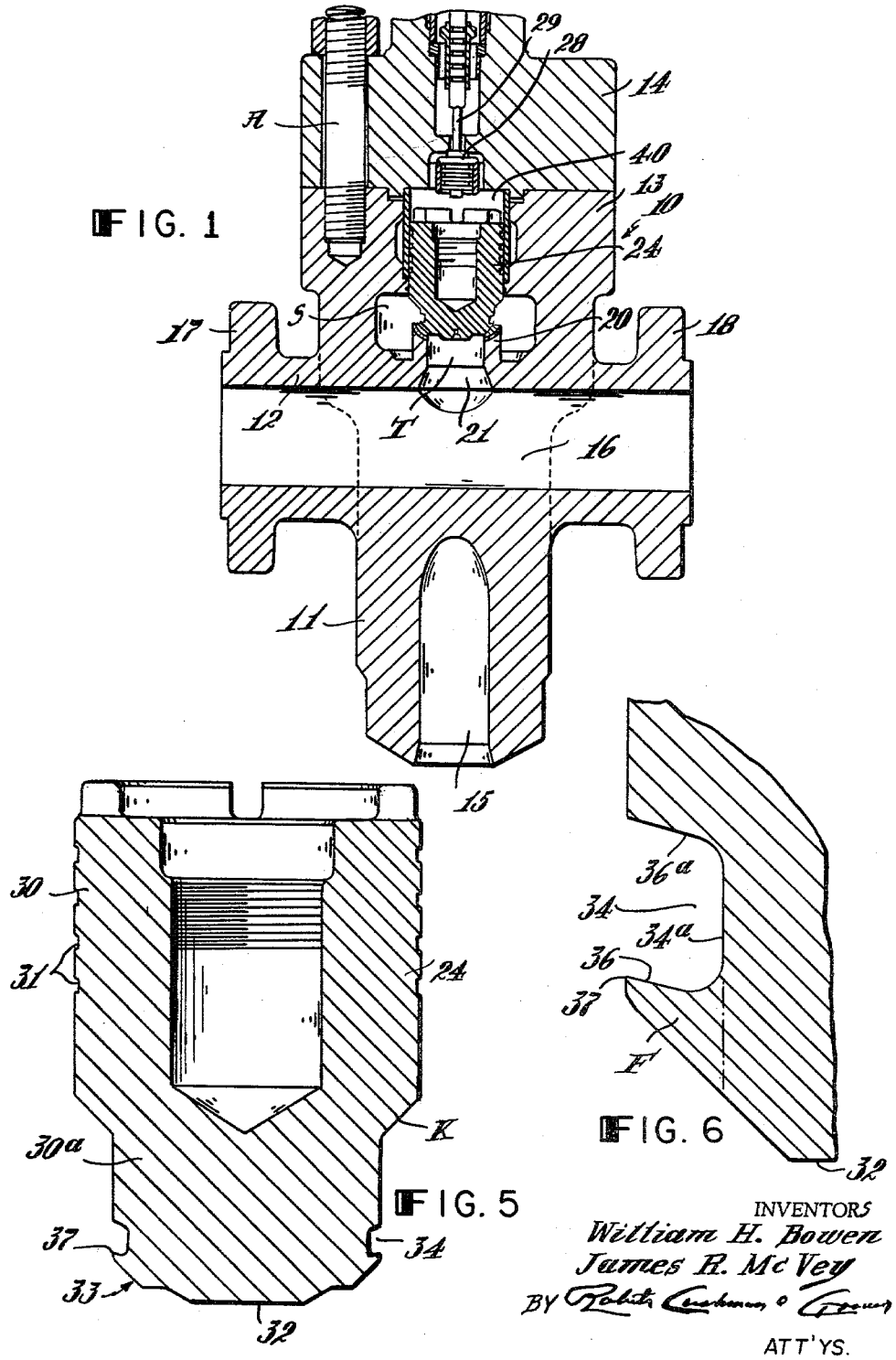

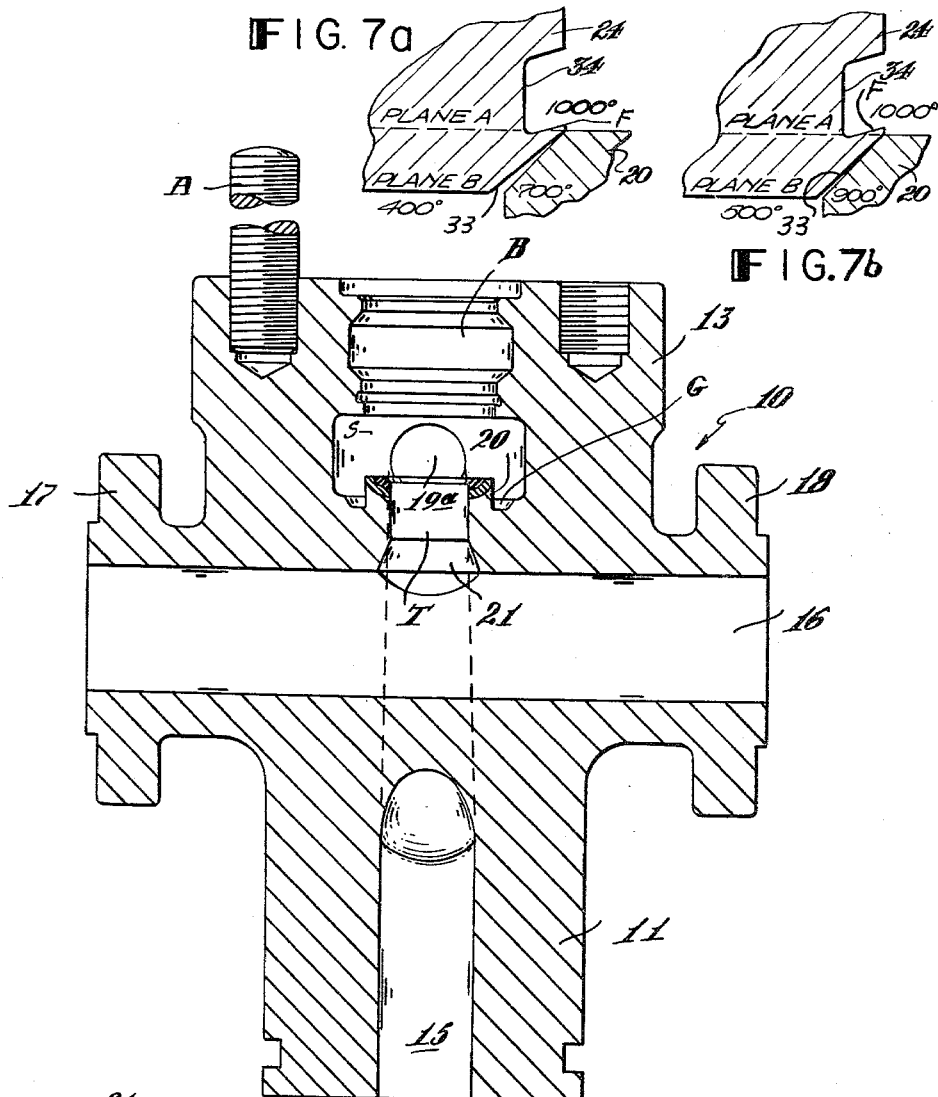
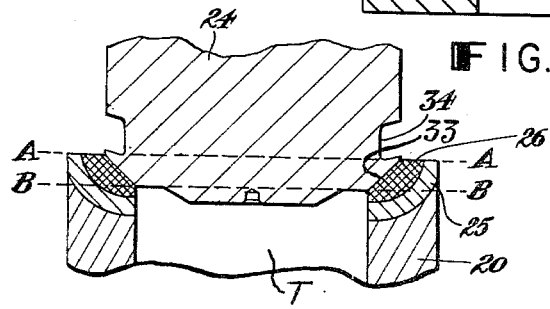

3,174,718
VALVE WITH IMPROVED HEAD SEAL
William H. Bowen, Bridgeport, and James R. McVey, Milford, Conn., assignors to Manning, Maxwell & Moore, Incorporated, Stratford, Conn., a corporation of New Jersey
Filed Nov. 17, 1961, Ser. No. 153,075
4 Claims. (Cl. 251—334)

This invention pertains to pressure-loaded valves, for example relief valves of the kind wherein a main valve disc is normally loaded and held closed or seated by fluid pressure, but lifts from its seat in response to the opening of a pilot valve which releases the loading pressure.

In the design of valves of this general type, intended for special use, one requirement which must be met is that of keeping the total height of the valve structure as small as possible. With this limitation in view and in order, at the same time, to insure requisite strength of the valve casing, the expedient has been adopted of locating the main valve seat relatively high in the casing and providing, within the wall of the casing, one or more passages, each of relatively small circumferential extent, leading upwardly from the valve inlet to an annular space coaxial with and surrounding the main valve seat, the pressure in this space being the normal inlet pressure.

Since the passage or passages through which the pressure fluid reaches said annular space occupy but a fraction of the entire circumferential extent of the casing, the fluid within said passages, assuming it to be steam or other highly heated fluid, heats the material of the casing, immediately adjacent to said passages, to a temperature substantially higher than that of intervening portions of the casing, with resultant unsymmetrical distortion of the casing and a corresponding distortion of the valve seat itself. Thus, in valves of this general type, difficulty has been experienced in preventing leakage between the valve seat and the main valve head. This leakage may become serious because sudden expansion of the pressure fluid, as it escapes through the leak passage, results in a very pronounced cooling effect, which causes contraction of the parts and thus increases the size of the leak passage. The present invention has for its principal object the provision of a pilot-controlled, pressure-loaded valve so devised as to prevent or minimize leakage, from the above causes, between the main valve head and its seat. A further object is to provide a valve of the above type having a main valve head so designed as to insure rapid conduction of heat from the pressure fluid within the surrounding annular space to the valve seat and to that part of the valve head which actually contacts the seat, thereby to neutralize the cooling action of the escaping fluid while also tending to distribute heat circumferentially of the seat and head and thereby minimize leakage resultant from distortion of the casing and seat. A further object is to provide a valve of the above type wherein the main valve head is so shaped that the pressure fluid, acting upon its upper surface, is effective to conform the valve head accurately to the seat surface.

Other and further objects and advantages of the invention will be pointed out in the following more detailed description and by reference to the accompanying drawings wherein:

FIG. 1 is a vertical diametrical section of a pressure-loaded valve embodying the present invention, with certain parts omitted, showing the pilot valve and the main valve head, seated, the valve illustrated being of that type wherein the fluid pressure inlet is at the lower end of the casing and the casing has a transversely extending discharge passage open at both ends;

FIG. 2 is a section, to large scale than FIG. 1, omitting the main valve head, the guide for the valve head, and the valve bonnet, but showing the main valve seat and the annular space surrounding it;

FIG. 5 is a vertical diametrical section, to larger scale than FIG. 1, showing the main valve head removed from the casing;

FIG. 6 is a fragmentary radial section through the valve head of FIG. 5, but to much larger scale;

FIG. 7 is a fragmentary section, on the same plane as FIG. 4, useful in explaining the theory of operation of the valve, and;

FIGS. 7a and 7b are fragmentary diagrammatic sections illustrative of typical temperature differences at different points circumferentially of the valve seat.

Figure 3:
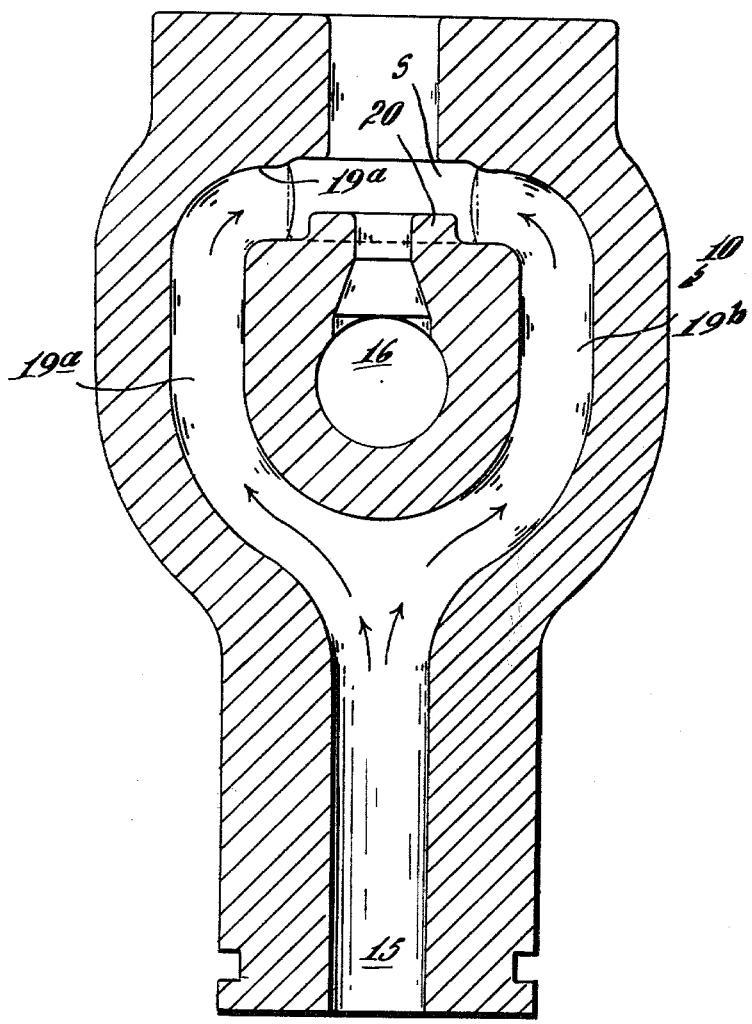
FIG. 3 is a section at right angles to FIG. 2, showing the valve body, before it has been machined for the reception of the seat and the disc guide, and the passages which lead upwardly through the wall of the casing to the annular space surrounding the valve seat.

Referring to the drawings, the numeral 10 (FIG. 1) designates the body of the valve, this body being, for example, an integral casting having the substantially cylindrical, downwardly directed lower portion 11 which, in use, is connected to a supply conduit; the transversely extending part 12; and the upwardly extending portion 13 having a finished upper surface for the reception of the bonnet 14 which houses the pilot valve. The lower part 11 of the casing has an axial, upwardly extending inlet passage 15, while the part 12 has a horizontal delivery passage 16 which, as here illustrated, is open at its opposite ends, the casing being provided with flanges 17 and 18 at its opposite sides for connection to delivery pipes, either of which may be closed by a suitable cap, if desired.

Figure 4:
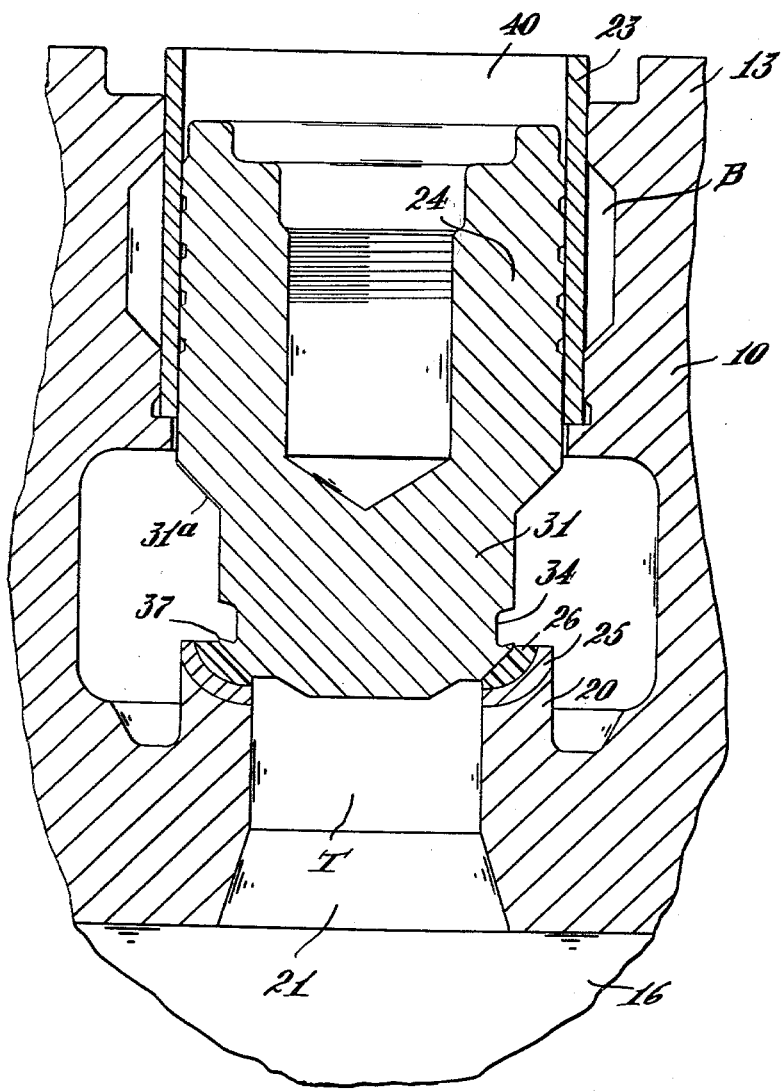
FIG. 4 is a section, to larger scale, in the same plane as FIG. 1, showing the main valve head seated and the guide in which the valve head slides.

In the upper part 13 of the valve body there is provided an annular chamber S which is connected with the inlet passage 15 by upwardly extending passages 19a and 19b (FIG. 3) formed within the body of the casing, these passages, as shown in FIG. 3, being located at diametrically opposite sides of the casing. In order to isolate the valve seat as much as possible from the casing proper, an annular groove G is provided at the bottom of chamber S, thus forming the integral, seat-supporting neck 20 projecting upwardly into the chamber S and which, because of the requirement that the valve be of minimum vertical height, is quite short. For example, in a valve having a seat diameter of 2.300 inches, the height of this neck may be of the order of 11/16 of an inch. As shown in FIGS. 1, 2 and 4, this neck 20 is coaxial with the chamber S and the initial casting is so machined as to provide an annular groove for the reception of a ring 25, for example, of chrome steel in which is set an annulus 26 of hard wear-resistant metal which is finished to form a valve seat, as here shown a beveled seat of 45° angle.

Above the annular chamber S the upper portion 13 of the valve casing is provided with an axial bore B within which there is fixed a cylindrical guide 23 (FIG. 4) for guiding the valve head or disc 24 in moving up and down relatively to the seat 26. This valve head, as is customary in valves of this kind, is thick and rigid so as to withstand, without distortion, the forces exerted by the pressure fluid which, in valves of this type, may be very great.

As shown in FIG. 5, the upper portion 30 of the valve head, which slides within the guide 23, is provided with circumferential labyrinth grooves 31 to reduce leakage upwardly along the guide 23. The lower portion 30a of the valve head is of smaller diameter than that portion which slides in the guide, as here shown, and has a flat lower end face 32 above which it is provided with an annular seat-engaging finished surface 33 which slopes at substantially the same angle as the seat surface of the ring 26, that is to say, as here illustrated, at an angle of approximately 45° to the horizontal.

Just above the upper outer edge of this seat-engaging surface, the valve head is provided with a circumferential groove 34 (FIGS. 5 and 6) whose lower wall 36, as here illustrated, slopes upwardly and outwardly at an angle of approximately 15° to the horizontal, the groove having an upper wall 36a, here shown as parallel to the wall 36 and spaced from the latter (in a three-inch valve), a distance of the order of 0.26 inch. For a valve of that size, the radial depth of the groove 34 is desirably such that the diameter of its inner wall 34a is of the order of 2.027 inches. If it be assumed that a geometrical cylinder, forming a downward continuation of the wall 34a, such as indicated in broken lines in FIG. 6, were to be drawn, that portion F of the valve head, located outwardly beyond this geometrical cylinder, may be referred to as a "lip" or "flange," whose root or base is integral with the lower part of the valve head proper and which tapers in vertical thickness upwardly toward the outer edge 37 of the bottom wall 36 of the groove.

The valve here disclosed is of the type in which the valve head is loaded by fluid-pressure in the space 40 and the release of fluid-pressure from the space 40 above the valve head and within the guide 23 is controlled by a pilot valve 28 (FIG. 1) having an actuating stem 29, and which is normally seated so as to prevent escape of fluid from the chamber 40 but which, when unseated, permits the fluid to escape from said chamber whereupon the valve head 24 is raised by the action of the pressure fluid in the chamber S against the shoulder K (FIG. 5) of the valve head. Pressure fluid is supplied to the chamber 40 in any customary way, for example by means of a leak port of small capacity. When the valve is closed, the floor 36 of the groove 34 is freely exposed to the static supply pressure subsisting in the chamber S, the latter always being in communication with the inlet space 15.

Because of the fact that the hot pressure fluid is confined to the diametrically opposite passages 19a and 19b (FIG. 3) in passing from the inlet to the space S, those portions of the valve casing which are closely adjacent to the passages 19a and 19b will be heated more than intervening portions with the result that the valve seat 20 may be non-uniformly heated and thus certain arcs of the valve seat may expand more than others thereby tending to induce leakage at the intervening arcs. When leakage does take place, in a valve of usual prior construction, a very pronounced local cooling effect results which causes contraction of those areas of the valve seat at which leakage takes place, thus increasing the leaks still further. However, in accordance with the present invention, and by the provision of the groove 34, in the valve disc 24, pressure within the chamber S (FIG. 1) may act on the relatively thin section of the valve disc immediately above the seating surface and thus deflect it downwardly to correct for minor irregularities in the seat due to unequal expansion. Thus, if the seat is not exactly round, so that the pressure within the chamber 40, in forcing the disc down onto the seat, causes the disc to make contact with the seat at separated spots only, the annular groove provides a measure of mechanical flexibility, permitting the seating force to deflect the thin lip at the areas of first contact and thus permit the disc to make contact throughout the circumference of the seat. As just mentioned the lip F makes first contact with the valve seat upon closure of the valve head. In this connection while the included angle of the underside of the lip and of the conical surface of the seat are approximately the same, the included angle of the underside of the lip, as shown in FIGS. 7a and 7b, is at least slightly greater than the included angle of the conical seat, thus assuring that the initial contact between the head and seat is between the underside of the lip and the upper outer edge portion of the conical seat. This contact of the valve lip with the upper edge portion of the seat is further assured as the maximum diameter of the lip is at least equal to and preferably slightly greater than the maximum diameter of the conical seat. For example, where the maximum diameter of the conical seat is on the order of 2.300 inches the maximum diameter of the under surface of the lip is about 2.315 inches.

While some of the reasons for the improved sealing obtained with this invention are not completely understood, it is believed that the following theory is applicable. In a valve of the type disclosed, the configuration and location of the inlet steam passages, as explained hereinabove, results in an uneven heat distribution within the valve seat in a direction circumferentially of the seat. As a result the three dimensional thermal expansion of the valve seat is not symmetrical. For example and with reference to FIGS. 7, 7a, and 7b, let us assume that the valve is used on superheated steam service and that the temperature of the fluid in the inlet passages, chamber S surrounding the valve seat and groove 34 in the valve head is on the order of 1000° F. (the temperatures here cited are merely for illustration and are not to be taken as representing actual temperatures or temperature differences). With reference to FIG 7a, the temperature of the seat adjacent the outer lower edge of the valve head might be 700° F. in the areas between the inlet passages 19a, 19b; while the temperature of the seat at a corresponding point in registry in the inlet passages, as shown in FIG. 7b, might be 900° F. Thus, there will be a tendency of the portion of the seat of FIG. 7b to have a temperature induced expansion radially inwardly of the seat axis greater than that of the seat portion of FIG. 7a. Also, the temperature gradient along the disc contacting surface of the seat being different in the portions of the seat represented by FIGS. 7a and 7b there is a tendency of the seat to have a temperature induced expansion parallel to the seat axis which is not uniform about the seat axis. This uneven heating of the seat thus tends to cause the seat to be out of round and to tend to warp out of its general plane, and the angle that conical surface of the seat makes with the seat axis tends to decrease but to a greater extent in the seat portion of FIG. 7a than in the portion represented in FIG. 7b. This complex deformation of the conical seating surface of the ring 26 will tend to cause leakage past the valve disc 24.

Turning now to the valve head 24 of this invention, when the head is seated, the upper inclined surface 36 of the lip F will be exposed to steam at 1000° F., while the bottom of the head will be exposed to the fluid in the passage T leading to the discharge passage 16. Assuming that the discharge passage is open to atmosphere, the bottom of the valve head will be exposed to the temperature of the atmosphere which will be significantly less than 1000° F. However, the temperature gradient along the seat contacting surface 33 of the head 24 is not uniform about the axis of the surface 33. For example, the temperature of the portion of the lip F located within the plane A—A and exposed to the steam in chamber S will be at the assumed steam temperature of 1000° F.; however the bottom surface of the head along the plane B—B is exposed to the temperature of the air in passage T and this air temperature is determined by the temperature of the valve body surrounding the passage T. By way of example only, the air temperature adjacent the bottom of the valve seat portion shown in FIG. 7a may be 400° F. while the air temperature at a corresponding point in FIG. 7b may be 500° F. These differences in air temperature are due to the different metal temperatures in the next adjacent seat areas. The form and degree of the thermal induced displacement of the surface 33 is, of course, in part determined by the air temperature to which the lower portion of the head 24 is exposed. Here particularly, the upper part of the flange F in the area of plane A—A will tend to expand radially outwardly of the head a greater amount than will the bottom of the head in the area of plane B—B. This will tend to increase the angle which the surface 33 makes with the axis of the valve seat.

However, as the air temperature in plane B—B will not be uniform about the seat axis, the change in the angle of the surface 33 and thus the angle of the outer conical surface of the lip F will not be uniform. Also the radial expansion of the lip F will be non-uniform tending to cause the lip to go out of round. However, it will be remembered that the temperature induced change in form of the valve seat is also not uniform and thus the lip deformation tends to correspond to the heat deformation. It will be noted that the temperature gradient along the surface 33, in the direction of the seat axis, is greater than that along the corresponding surface of the seat. The angle of the surface 33 will thus tend to increase a greater amount than the angle of the disc seating surface decreases. This is advantageous as it tends to assure good sealing contact between the lip and seat adjacent the top of the seat.

The rather substantial temperature gradient along the surface 33 tends to cause the portion of the thin lip F in the area of contact with the seat to deform downwardly into seat contact, particularly in the areas of the lower temperature gradients across the seat and this compensates for irregular expansion of the seat in the direction of the seat axis. This last mentioned thermal effect on the lip also may tend to assist in compensating for the unequal radial expansion of the seat, although as mentioned above, the lip will also undergo a corresponding and compensating non-uniform radial expansion. Thus the total thermal effect on the thin lip F while being related to the thermal effect on the seat, is different in degree and to some extent in kind to tend to assure that good sealing will be obtained regardless of the non-uniform heating of both the valve head and seat. As noted above the force with which the valve head is seated by the fluid pressure in the chamber 40 will tend to effect a deformation of the thin lip F to compensate for irregularities in the seat, and also because of the fact that the outer portion of the flange F is relatively thin, as compared with the body of the valve head, this outer portion, in response to the high pressure subsisting in the groove 34, tends to deflect downwardly and to conform to any slight irregularities in the upper portion of the valve seat so as, in this manner, to provide an additional safeguard against the formation of leaks or the increase in size of microscopic leaks which may develop.

Although the outer portion of the flange F may be very thin, for the accomplishment of the above results, it will be noted that the main part of the valve head and, in particular, the lower portion of the seat-engaging surface 33 is of substantial dimensions and sufficiently solid to absorb the shock of closing when the valve approaches its seat so that even though the outer part of the flange F may be flexible in response to fluid-pressure, there is no danger of permanent injury to the seat-engaging surface of the valve due to mechanical shock. It will be apparent to those skilled in the art that the absorbtion of shock by the main body of the valve head is by engagement of the lower rigid conical portion of head with the valve seat. This would occur if the valve were closed with a force sufficient to flex the lip F so that contact was made between the seat and the conical surface on the valve head from a point adjacent the outer edge of the lip F to a point at least below the juncture of the lip with the rigid main body of the head. However, from the foregoing and from a consideration of the drawings, and particularly 7a and 7b, it will also be apparent to those skilled in the art that normally the only contact between the valve head and seat will be between the underside of the lip F and the upper outer edge portion of the conical valve seat.

Merely by way of example of dimensional proportions whereby desirable results have been attained, the valve herein specifically illustrated has an effective maximum seat diameter of 2.300 inches, the seat-surface sloping at an angle of 45° to the axis of the seat; the valve head (of steel or other similarly flexible metal) having a seat-contacting face, and closely above the upper edge of said face having a circumferential groove which is 0.260 inch in maximum axial depth and whose inner diameter in 2.027 inches, thereby providing a circumferential lip which is substantially triangular in radical section, the bottom wall of this groove being inclined upwardly and outwardly at an angle of 15° to the horizontal and the outer edge of this bottom wall of the groove being spaced from the upper edge of the inclined seat-engaging surface of the disc a distance of approximately 0.016 inch, which represents the minimum thickness of the lip resultant from the provision of a groove so located and dimensioned.

While one desirable embodiment of the invention has herein been illustrated and described by way of example, it is to be understood that the invention is broadly inclusive of any and all modifications such as constitute equivalents in structure or function of those herein specifically described.

We claim:

1. In a valve of a type having a valve body provided with an annular metallic valve seat having an internal conical seating surface at one end, the inner surface of said seat defining a fluid passage communicating outwardly of the body, a valve head supported for movement coaxially toward and away from said one end of the seat, means providing a chamber around said one end of the seat, and means providing a second fluid passage in the body communicating at one end with said chamber and at the other end outwardly of said body, said valve head having a main rigid body provided with a conical surface at one end thereof received within the opening defined by said seating surface in spaced relation thereto, said conical surface terminating at the end thereof remote from said one end of the head in a relatively thin deformable metallic lip having a conical surface which is engaged with the outer edge portion of said conical seating surface and which is a continuation of said conical surface on the head body, the included angle of said conical surface on the lip being at least slightly greater than the included angle of said seating surface when said lip is spaced from said seat and the maximum diameter of said conical surface of the lip being at least equal to the maximum diameter of said seating surface, whereby normally the sole contact between the head and seat will be between the conical surfaces of said lip and seat at the outer edge portion of said seating surface, the conical surface on said rigid body of the head being engageable with said conical seating surface upon closing of the head with sufficient force to flex said lip and permit such engagement, thereby protecting the lip against excess flexure and absorbing the shock of said lip.

2. In a valve of a type having a valve body provided with an annular metallic valve having internal conical seating surface at one end, the inner surface of said valve seat defining a fluid passage communicating outwardly of the valve body, a valve head supported for movement coaxially toward and away from said one end of the seat, means providing a chamber around said one end of the seat, and means providing inlet fluid passage means in the body communicating at one end with said chamber and at the other end externally of said body, said valve head having a main body provided with a rigid conical portion at one end thereof received within the portion of said opening defined by said conical seating surface of the seat, said conical portion terminating at the end thereof remote from said one end of the head in a relatively thin tapered metallic lip having a conical surface which is a continuation of said conical portion on said main body of the head, the included angle of said conical surface on the lip being at least slightly greater than the included angle of said seating surface when said lip is spaced from said seat and the maximum diameter of said conical surface on the lip being at least slightly greater than the maximum diameter of said seating surface, whereby normally the sole contact between the head and seat will be between the conical surface of said lip and seat at the outer edge portion of said seating surface, the lip undergoing a three dimensional deformation in response to a substantial temperature gradient along said conical surface of the lip thereby to compensate for temperature induced irregularities in the shape of said conical seating surface due to non-uniform heating of the seat axially and circumferentially thereof.

3. In a valve of a type having a valve body provided with an anular valve seat defining a fluid flow passage, the seat being provided with an internal conical seating surface at one end of said passage, a metallic valve head movable toward and away from said seating surface to control fluid flow through the valve, the body being provided with a fluid discharge passage leading from the other end of said passage defined by the valve seat, means providing a chamber in said valve body surrounding said one end of the valve seat, and means providing fluid inlet passage in the valve body communicating at one end with said chamber at points spaced angularly about the axis of said valve seat, whereby the heating of the valve body and seat by fluid in said inlet means will be non-uniform about the axis of the seat, the head being provided with a rigid main body having a conical surface disposed coaxially of and at least partially within said conical surface of the seat and terminating at a point remote from said one end of the head in a thin deformable metallic lip extending circumferentially of the valve head and having a conical surface forming a continuation of the conical surface on the main body portion of the head, said lip having a generally annular surface extending from said main body of the head and overlying said conical surface of the lip and being exposed to fluid pressure within said chamber, whereby fluid pressure within said chamber will tend to flex said lip toward said valve seat, the conical surface of the lip being engaged with upper edge portion of the conical surface of the seat with said engagement between said lip and seat normally being the sole engagement between said head and seat, the included angle of the conical surface of said lip being greater than the included angle of the conical surface of the seat when said lip is spaced from said seat and the maximum diameter of said conical surface on the lip being at least equal to the maximum diameter of the conical seating surface, said conical portion of the main body of the valve head and a portion of the adjoining conical surface of the lip normally being exposed to the fluid within said passage defined by said valve seat, whereby when the inlet fluid temperature is significantly greater than the temperature of the surrounding atmosphere and the fluid temperature in the passage defined by said seat the lip will undergo a three dimensional deformation in response to a temperature gradient axially and circumferentially thereof to compensate for temperature induced irregularities in the shape of the valves seat due to non-uniform heating of the seat axially and circumferentially thereof.

4. In a valve of a type having a valve body provided with an annular valve seat defining a fluid flow passage, the seat being provided with an internal conical seating surface at one end of said passage, a metallic valve head moveable toward and away from said seating surface to control fluid flow through the valve, the body being provided with a fluid discharge passage leading from the other end of said passage defined by the valve seat, means providing a chamber in said valve body surrounding said one end of the valve seat, and means providing fluid inlet passages in the valve body communicating at one end with said chamber at points spaced angularly about the axis of said valve seat whereby the heating of the valve body and seat by fluid in said inlet means will be non-uniform about the axis of the seat, the head being provided with a rigid main body having a conical surface disposed coaxially of and at least partially within said conical surface of the seat and terminating at a point remote from said one end of the head in a thin deformable metallic lip extending circumferentially of the valve head and having a conical surface forming a continuation of the conical surface on the main body portion of the head, the conical surface of the lip being engaged with the upper edge portion of the conical surface of the seat with said engagement between said lip and seat normally being the sole engagement between said head and seat, the included angle of the conical surface of said lip being greater than the included angle of the conical surface of the seat when said lip is spaced from said seat and the maximum diameter of said conical surface on the lip being at least equal to the maximum diameter of the conical seating surface, the conical surface on said rigid body of the head being engageable with said conical seating surface in response to application of a force on the head in a closing direction sufficient to cause flexure of said lip with the engagement between the rigid body and seat limiting flexure of said lip, said conical portion of the main body of the valve head and a portion of the adjoining conical surface of the lip normally being exposed to the fluid within said passage defined by said valve seat, whereby when the inlet fluid temperature is significantly greater than the temperature of the surrounding atmosphere and the fluid temperature in the passage defined by said seat the lip will undergo a three dimensional deformation in response to a temperature gradient axially and circumferentially thereof to compensate for temperature induced irregularities in the shape of the valve seat due to non-uniform heating of the seat axially and circumferentially thereof.

References Cited by the Examiner

UNITED STATES PATENTS

| 1,679,779 | 8/28 | Oberhuber | 251—334 |
| 2,021,773 | 11/35 | Gentzel | 251—333 |
| 2,166,390 | 7/39 | Briscoe et al. | 251—33 X |
| 2,509,880 | 5/50 | Pelton | 251—63 |
| 2,893,685 | 7/59 | Van Camp | 251—334 |
| 3,054,422 | 9/62 | Napolitano | 251—334 |

FOREIGN PATENTS

| 2,529 | 4/96 | Great Britain. |

M. CARY NELSON, *Primary Examiner.*